May 20, 1952  M. W. ROSCOE ET AL  2,597,186
FEED CONTROL GATE FOR MATERIAL-HANDLING HOPPERS
Filed Nov. 9, 1949  2 SHEETS—SHEET 1
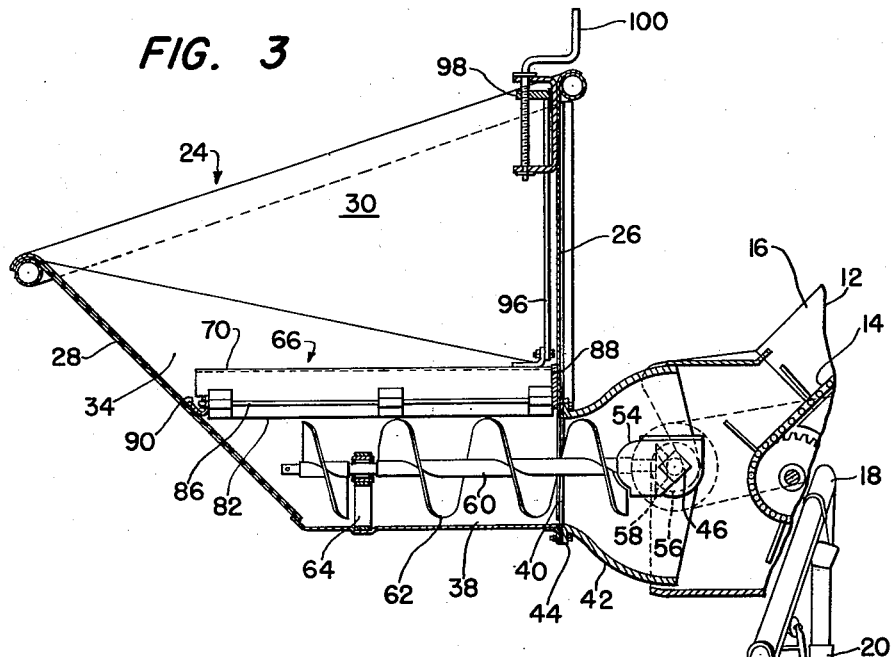
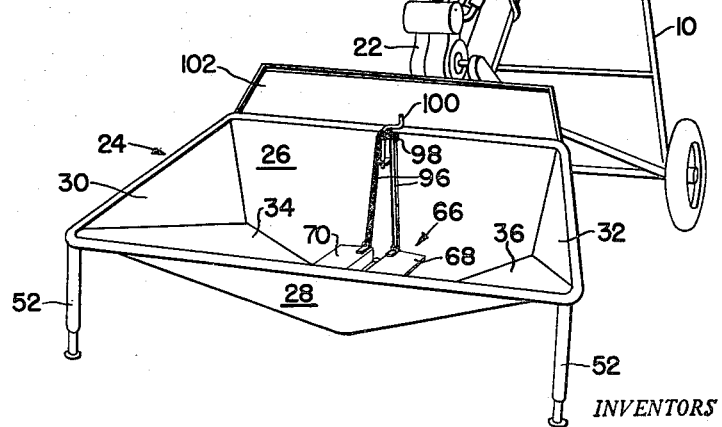
INVENTORS
MERRILL W. ROSCOE &
ROYAL L. BELDIN
ATTORNEYS May 20, 1952   M. W. ROSCOE ET AL   2,597,186
FEED CONTROL GATE FOR MATERIAL-HANDLING HOPPERS
Filed Nov. 9, 1949   2 SHEETS—SHEET 2

INVENTORS
MERRILL W. ROSCOE &
ROYAL L. BELDIN
BY
ATTORNEYS

Patented May 20, 1952

2,597,186

UNITED STATES PATENT OFFICE 2,597,186

FEED CONTROL GATE FOR MATERIAL-HANDLING HOPPERS

Merrill W. Roscoe, Moline, Ill., and Royal L. Beldin, Davenport, Iowa., assignors to Deere & Company, Moline, Ill., a corporation of Illinois Application November 9, 1949, Serial No. 126,271

9 Claims. (Cl. 222—317)

This invention relates to a material-handling device and more particularly to means for controlling the rate of flow of material out of a hopper or equivalent material-receiving means.

The embodiment of the invention disclosed herein was developed primarily for use in a loader of the type adapted to handle small grain for loading, unloading and storage purposes on farms. Typical basic structure of such small grain elevator includes a wheeled frame on which is carried a conveyor inclining upwardly from a receiving end adjacent the ground to a discharge end disposed at a considerable height above the ground. The lower end is a material-receiving end to which material, such as grain, is supplied from a bin, truck or pile, to be elevated by the conveyor to effect transfer of such material to another material-handling means. For example, grain may be dumped by a truck at the receiving end of the conveyor for ultimate elevation and discharge into a bin, thereby eliminating manual handling of the grain.

In the use of the elevator for receiving material from a truck or wagon for ultimate transfer to a bin or other storage receptacle, it is common practice to equip the receiving end of the conveyor with a hopper into which the truck or wagon may dump its contents. In most cases, the hopper is equipped with a conveyor, ordinarily an auger, for moving the material out of the hopper into the receiving end of the elevator for transfer to the upwardly moving conveyor. In order that the device may operate most efficiently, it is desirable to provide means for controlling the rate of flow of the material from the hopper to the receiving end of the elevator.

According to the present invention, improved material-feed-control means has been provided in a hopper of the type having opposite ends and including downwardly and inwardly sloping bottom walls which converge to a trough at the bottom of the hopper and in which a conveyor operates to move material out of an opening in one of the end walls of the hopper. The material-feed-control means includes, specifically, a pair of hinged gate members which, when closed, form a structure in the form of an inverted U to enclose the auger and trough and which, when opened, provide communication with the auger and trough from both sides and also from above. The gates are so proportioned that when fully opened the opening at each side of the auger and trough is considerably larger than the opening at the top of the auger and trough. In this respect, cognizance is taken of the fact that material contained in a hopper in which an auger is utilized to empty the hopper will move into the auger from only one side to the exclusion of movement of the material into the auger from the other side. Conventional control or gate means that exposes both sides but not the top of the auger does not take advantage of the full capacity of the auger. According to the present invention, the gate means provides an opening at the top through which material may enter to be moved by the auger, thus increasing the amount of material handled by the auger.

The foregoing and other important objects and desirable features inherent in and encompassed by the invention will become apparent as the following detailed description progresses in connection with the accompanying sheets of drawings, in which Figure 1 is a perspective view of a typical small grain elevator associated with a hopper equipped with material-feed-control means;

Figure 3 is a longitudinal sectional view taken on the line 3—3 of Figure 2;

Figure 2:
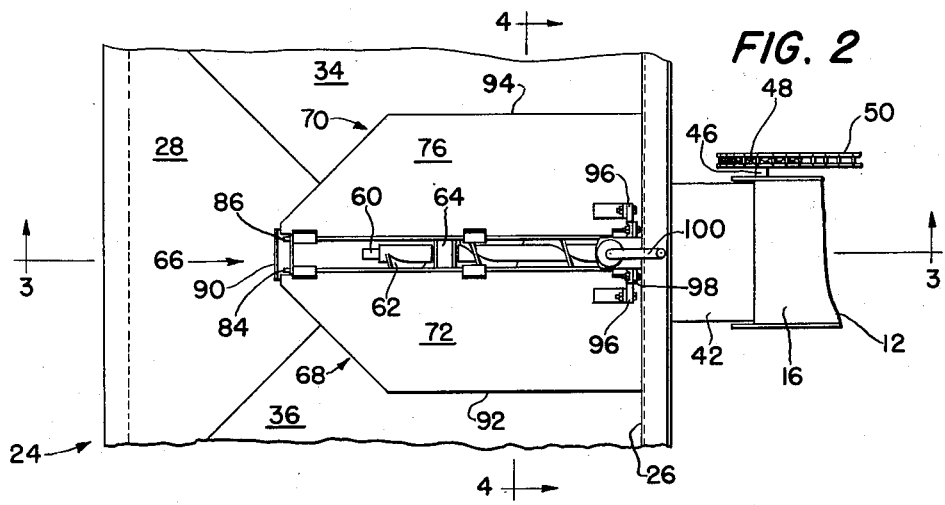
Figure 2 is a top plan view of an intermediate portion of the hopper, showing the material-feed-control means in fully opened position.

The use of the invention in connection with the structure illustrated is merely representative of the utility of a preferred embodiment of the invention. Hence, the disclosure should be taken as illustrative and not limiting.

The small grain elevator shown in Figure 1 comprises a wheeled frame 10 on which is carried an upwardly inclined tubular structure 12 within which is contained an endless conveyor, the lower portion of which is indicated at 14 in Figure 3. The conveyor tube 12 has a lower, material-receiving end 16 (Figure 3) positioned adjacent the ground. The conveyor tube is relatively long and inclines upwardly to a discharge end 18 with which is associated a flexible discharge spout 20. The endless conveyor 14 may be powered by any suitable means, such as an internal combustion engine 22.

The lower end 16 of the conveyor tube 12 is commonly called the "boot" and will be so designated hereinafter. In order that the elevator may be equipped to handle material dumped from a truck, wagon or equivalent receptacle, it is provided with a hopper 24 associated with the boot end 16. The hopper illustrated is rectangular as viewed from above and comprises opposite end walls 26 and 28 and opposite side walls 30 and 32 which merge respectively into bottom walls 34 and 36 that slope inwardly and downwardly to converge and form a trough 38 extending between the end walls 26 and 28.

The hopper is positioned with the end wall 26 proximate to the boot end 16 of the elevator, and this end wall has formed therein a square opening 40 by means of which and a bell housing 42 material-flow communication is established between the interior of the hopper and the interior of the boot 16.

The bell housing 42 is flanged at 44 and is rigidly secured to the outside of the hopper wall 26. The bell housing is pivotally connected on a transverse axis to the boot 16 by means including a transverse shaft 46 which extends a one side of the boot and which has keyed thereto a sprocket 48. This sprocket serves as part of means for driving the shaft 46 from the internal combustion engine 22, such means being illustrated in part in Figures 2 and 3 as including a driving chain 50. The connection or support of the hopper 24 on the boot 16 by means of the bell housing 42 and shaft 46 is complemented by additional support of the hopper in the form of a pair of vertically adjustable legs 52 (Figure 1).

A small gear housing 54 is disposed within the bell housing 42 and encloses a pair of bevel gears 56 and 58, the first of which is keyed to the shaft 46 and the second of which is keyed to an auger or conveyor shaft 60 that extends through the opening 40 and into the hopper 24. The shaft 60 has formed thereon an auger or helicoid 62 which constitutes a conveyor running lengthwise of the trough 38 for moving material out of the trough and through the bell housing 42 into the boot 16 for ultimate handling by the conveyor 14. The end of the shaft 60 remote from the bevel pinion 58 is journaled in a bearing 64 mounted on the bottom of the trough 38.

The material-feed-control means is designated herein generally by the numeral 66. This means includes a pair of gates 68 and 70, each in the form of an inverted L in section. The gate 68 includes a side section 72 and a top or upper section 74. The gate 70 includes side and top sections 76 and 78, respectively.

The top section 74 of the gate 68 forms a junction or corner with the side section 72 and its free or terminal edge 80 runs lengthwise thereof and parallel to the axis of the auger shaft 60. The top section 78 of the gate 70 has a complementary lengthwise edge 82. The gates 68 and 70 are respectively pivoted on parallel axes above and parallel to the axis of the auger shaft 60 by means of a pair of rods 84 and 86, opposite ends of which are respectively carried in plates 88 and 90 carried respectively by the end walls 26 and 28.

Figures 4, 5:
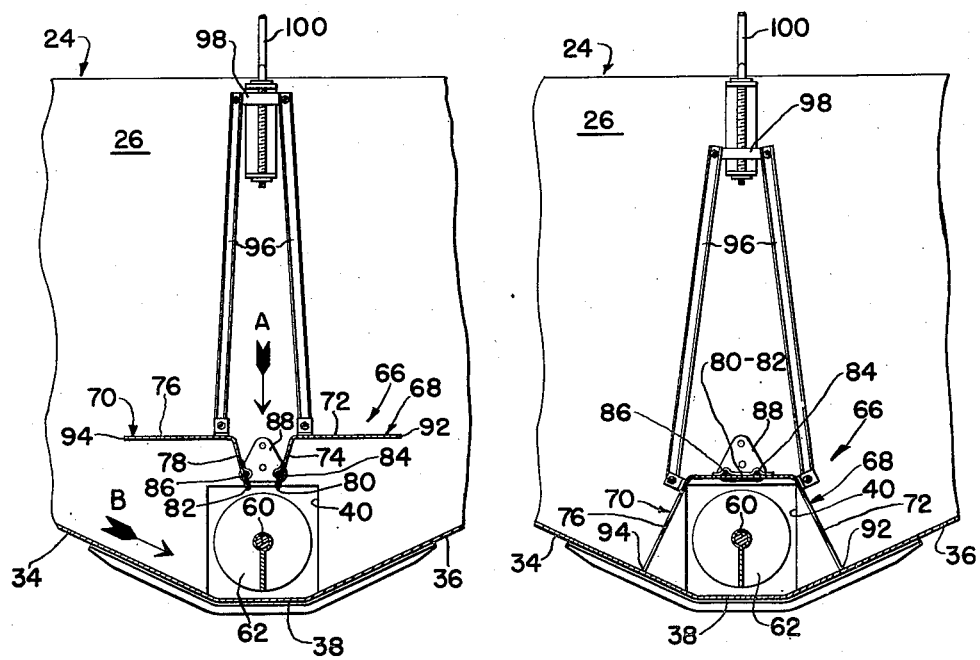
Figure 4 is a fragmentary transverse section taken on the line 4—4 of Figure 2.
Figure 5 is a view similar to Figure 4 but showing the gate elements of the material-feed-control means in fully closed position.

When the gates 68 and 70 are closed, as in Figure 5, they form an inverted U-shaped or tunnel structure which embraces or closes the upper and side portions of the trough 38 and auger 62. The pivot axes established by the rods 84 and 86 are spaced apart from a longitudinal upright plane through the center of the trough 38. The terminal or lengthwise edges 80 and 82 of the top sections 74 and 78 respectively are spaced inwardly of the pivot axes at 84 and 86. As shown in Figure 5, these edges occlude to enclose the upper portion of the material-feed-control means 66, and thus prevent the entrance of material into the trough from a level above that of the top sections 74 and 78. The side sections 72 and 76 of the gates respectively have lower lengthwise edges 92 and 94 which conform to the bottom walls 36 and 34 and the adjoining end wall 28 and which, when closed, cooperate with these walls to establish a closure at the side of the material-feed-control means so that material in the hopper cannot enter either side of the auger and trough.

In the preferred embodiment of the invention, the sections of each gate are interconnected by being formed integral with each other. Thus, the sections of each gate are interconnected for movement together. The two gates are further interconnected for movement together by actuating means including a pair of links 96 pivotally connected at their lower ends to the gates 68 and 70 and pivotally connected at their upper ends to a cross member 98 movable vertically in opposite directions by means of a cranked screw 100 approximately carried by the hopper end wall 26.

As shown in Figure 1, the hopper may include a flared shield 102 to prevent the spilling of grain over the end wall 26 of the hopper.

In use and operation, the hopper 24 is connected to the elevator by the means already described. The gates 68 and 70 may be closed by means of the actuating means 96—100 and a truck or equivalent receptacle may be driven up to the hopper and the contents thereof dumped into the hopper. The rate of flow of material to be transferred from the hopper to the elevator via the auger 62 and material-feed outlet opening 40 may be conveniently regulated by the material-feed-control means 66. The relationship between the top and side sections of each gate is such that the side sections have wider ranges of opening than do the top sections. That is to say, when the gates are fully opened as in Figure 4, the distance between each bottom wall and the terminal edge of the proximate side section is considerably greater than the distance between the spaced-apart or non-occluding edges 80 and 82 of the top sections. Hence, the flow of material between the edges 80 and 82, as indicated by the arrow A in Figure 4, will be substantially less than the quantity of material flowing at B in Figure 4. Hence, the material-feed-control means provided according to the present invention establishes two inlet openings through the auger and trough. It is known, of course, that as long as material is flowing in through the side in the direction of the arrow B, the auger will not accept material from the opposite side. Therefore, without the opening provided at the spaced-apart edges 80—82, the auger would not be operating at anywhere near maximum capacity. As soon as the auger has emptied the hopper of material flowing in from the direction B, it will take material from the opposite side. Thus, although there are three inlets to the auger and trough, only two are available at any one time.

The rate of flow of material may be easily regulated by opening and closing the gates 68 and 70 to any desired degree. As stated above, the proportions of the sections are such that the material flow in the direction of the arrow B will at any time be substantially greater than the flow in the direction of the arrow A, since a substantial occlusion at 80—82 will occur substantially before occlusion at either 92—36 or 94—34.

The material-feed-control means and the actuating means therefor are simply and economically constructed and are designed so that they may be easily installed in hoppers of existing types. In view of the simplicity of construction, the means is easily regulated and requires little or no attention.

Other objects and features of the invention not specifically enumerated herein will undoubtedly occur to those skilled in the art, as will numerous modifications and alterations in the preferred embodiment of the invention disclosed, all of which may be achieved without departing from the spirit and scope of the invention as defined in the appended claims.

What is claimed is:

1. A material-handling device, comprising: a hopper having opposite end walls and downwardly sloping bottom walls converging to a trough extending between the end walls so that material contained in the hopper has gravity flow to the trough; means providing a material-outlet opening in one end wall in alinement with the trough; an auger, rotatable in the trough on an axis lying lengthwise of the trough, for moving material out of the hopper through said end wall opening; material-feed-control means in the hopper and enclosing the upper and side portions of the auger and trough to prevent material in the hopper from flowing into the auger and trough, said means including a pair of movable side sections for respectively opening said means to both sides of the auger and trough, and a movable top section for opening said means to the top of the auger and trough; means for actuating the sections, including interconnecting means effecting simultaneous opening or closing movement of all three sections; and said sections being so proportioned and arranged that each side section effects a wider opening than the top section, whereby the flow of material from the hopper into either side of the auger and trough is greater than the flow into the top of the auger and trough.

2. A material-handling device, comprising: a hopper having opposite end walls and downwardly sloping bottom walls converging to a trough extending between the end walls so that material contained in the hopper has gravity flow to the trough; means providing a material-outlet opening in one end wall in alinement with the trough; an auger, rotatable in the trough on an axis lying lengthwise of the trough, for moving material out of the hopper through said end wall opening; material-feed-control means in the hopper and enclosing the upper and side portions of the auger and trough to prevent material in the hopper from flowing into the auger and trough, said means including a pair of movable side sections for respectively opening said means to both sides of the auger and trough, and a pair of movable top sections, said top sections being respectively connected to the side sections for movement respectively therewith; each side section and its respective top section providing an inverted L-shaped gate, each side section having a lower edge effecting a closure with the proximate bottom wall of the hopper, and said gates being arranged to embrace the top and sides of the auger and trough with the top sections extending toward each other and occluding at the top of the auger; actuating means interconnecting the gates for effecting the simultaneous opening or closing thereof; and said top and side sections being so proportioned that opening of the gates effects a wider opening at the side sections than at the top sections.

3. A material-handling device, comprising: a hopper having opposite end walls and downwardly sloping bottom walls converging to a trough extending between the end walls so that material contained in the hopper has gravity flow to the trough; means providing a material-outlet opening in one end wall in alinement with the trough; an auger, rotatable in the trough on an axis lying lengthwise of the trough, for moving material out of the hopper through said end wall opening; material-feed-control means in the hopper and enclosing the upper and side portions of the auger and trough to prevent material in the hopper from flowing into the auger and trough, said means including a pair of movable side sections for respectively opening said means to both sides of the auger and trough, and a pair of top sections arranged for movement relative to each other between open and closed positions to selectively open or close said means directly over the auger, said top sections being respectively connected to the side sections for movement respectively with said side sections so that all of said sections open and close simultaneously; actuating means connected to the sections for effecting said simultaneous opening or closing thereof; and said top and side sections being so proportioned that opening thereof effects a wider opening at the side sections than at the top sections.

4. A material-handling device, comprising: a hopper having opposite end walls and downwardly sloping bottom walls converging to a trough extending between the end walls so that material contained in the hopper has gravity flow to the trough; means providing a material-outlet opening in one end wall in alinement with the trough; an auger, rotatable in the trough on an axis lying lengthwise of the trough, for moving material out of the hopper through said end wall opening; material-feed-control means in the hopper and enclosing the upper and side portions of the auger and trough to prevent material in the hopper from flowing into the auger and trough, said means including a pair of movable side sections for respectively opening said means to both sides of the auger and trough, and a pair of movable top sections, said top sections being respectively connected to the side sections for movement respectively therewith; each side section and its respective top section providing an inverted L-shaped gate, each side section having a lower edge effecting a closure with the proximate bottom wall of the hopper, and said gates being arranged to embrace the top and sides of the auger and trough with the top sections extending toward each other and occluding at the top of the auger; and actuating means interconnecting the gates for effecting the simultaneous opening or closing thereof.

5. A material-handling device, comprising: a hopper having opposite end walls and downwardly sloping bottom walls converging to a trough extending between the end walls so that material contained in the hopper has gravity flow to the trough; means providing a material-outlet opening in one end wall in alinement with the trough; an auger, rotatable in the trough on an axis lying lengthwise of the trough, for moving material out of the hopper through said end wall opening; material-feed-control means in the hopper and enclosing the upper and side portions of the auger and trough to prevent material in the hopper from flowing into the auger and trough, said means including a pair of movable side sections for respectively opening said means to both sides of the auger and trough, and a pair of top sections arranged for movement relative to each other between open and closed positions to selectively open or close said means directly over the auger, said top sections being respectively connected to the side sections for movement respectively with said side sections so that all of said sections open and close simultaneously; and actuating means connected to the sections for effecting said simultaneous opening or closing thereof.

6. Material-feed-control means for a material-handling device including a trough, comprising: a pair of movable parallel gates interconnected for movement together, each gate being in the form of an inverted L in section to provide a top section and a side section, and normally arranged with the top sections extending toward each other and having occluding proximate portions and with the side sections spaced apart and extending downwardly, said gates together providing an inverted U-shaped structure positionable over the trough with the side sections closing opposite sides of the trough and the top sections closing the top of the trough; and means for mounting the gates adjacent the trough, including pivots on a pair of axes parallel to the line of occlusion of the top sections, one axis at each side of said line so that the occluding portions of the top sections move downwardly and apart as the side sections move outwardly.

7. The invention defined in claim 6, further characterized in that: the depending dimension of each side section is substantially greater than the distance between a pivot axis and the line of occlusion between the top sections, whereby the side sections have a greater range of opening than the top sections.

8. A material-handling device, comprising: a hopper having opposite end walls and a bottom wall arranged so that material contained in the hopper has gravity flow to the bottom of the hopper; means providing a material-outlet opening in one end wall; a conveyor running along the bottom of the hopper, for moving material out of the hopper through said end wall opening; material-feed-control means in the hopper and providing an inverted U-shaped structure enclosing the upper and side portions of the conveyor to prevent material in the hopper from flowing into the conveyor, said structure including a side section alongside the conveyor and movable from a position of occlusion with a portion of the bottom wall of the hopper to an open position spaced from said bottom wall for selectively closing off or exposing said one side of the conveyor to contents of the hopper, and a movable top section directly over the top of the conveyor and movable relative to a proximate upper portion of the structure from a position of occlusion with said portion to an open position spaced from said portion for selectively closing off or exposing the top of the conveyor to contents of the hopper; means interconnecting the sections for selectively effecting movement of said sections simultaneously to their open positions or simultaneously to their closed positions; said sections being so proportioned and arranged that the side section effects a wider opening than the top section, whereby the flow of material to said one side of the conveyor is greater than the flow to the top of the conveyor.

9. A material-handling device, comprising: a hopper having opposite end walls and a bottom wall arranged so that material contained in the hopper has gravity flow to the bottom of the hopper; means providing a material-outlet opening in one end wall; a conveyor running along the bottom of the hopper, for moving material out of the hopper through said end wall opening; material-feed-control means in the hopper and providing an inverted U-shaped structure enclosing the upper and side portions of the conveyor to prevent material in the hopper from flowing into the conveyor, said structure including a side section alongside the conveyor and movable from a position of occlusion with a portion of the bottom wall of the hopper to an open position spaced from said bottom wall for selectively closing off or exposing said one side of the conveyor to contents of the hopper, and a movable top section directly over the top of the conveyor and movable relative to a proximate upper portion of the structure from a position of occlusion with said portion to an open position spaced from said portion for selectively closing off or exposing the top of the conveyor to contents of the hopper; and means interconnecting the sections for selectively effecting movement of said sections simultaneously to their open positions or simultaneously to their closed positions.

MERRILL W. ROSCOE.
ROYAL L. BELDIN.

REFERENCES CITED

The following references are of record in the file of this patent:

UNITED STATES PATENTS

| Number | Name | Date |
|---|---|---|
| 293,464 | Holt | Feb. 12, 1884 |
| 940,538 | Le Gore | Nov. 16, 1909 |
| 1,000,004 | Huber | Aug. 11, 1911 |
| 1,536,073 | Carter | May 5, 1925 |
| 1,554,145 | Vugrinec | Sept. 15, 1925 |
| 2,343,707 | Roland | Mar. 7, 1944 |
| 2,393,849 | Wertz | Jan. 29, 1946 |
| 2,412,121 | Bradshaw | Dec. 3, 1946 |
| 2,438,301 | Schulte | Mar. 23, 1948 |